United States Patent
Dyer et al.

(10) Patent No.: US 9,068,661 B2
(45) Date of Patent: Jun. 30, 2015

(54) CURVED FLAPPER SEAL WITH STEPPED INTERMEDIATE SURFACE

(75) Inventors: Robert J. Dyer, Coweta, OK (US); Thomas S. Myerley, Broken Arrow, OK (US); Wade A. Miller, Broken Arrow, OK (US); Matthew P. Presley, Tulsa, OK (US); Michael L. Hair, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 488 days.

(21) Appl. No.: 13/490,073

(22) Filed: Jun. 6, 2012

(65) Prior Publication Data

US 2013/0327974 A1 Dec. 12, 2013

(51) Int. Cl.
- *F16K 1/42* (2006.01)
- *F16K 15/03* (2006.01)
- *E21B 34/10* (2006.01)
- *E21B 33/00* (2006.01)
- *E21B 34/00* (2006.01)

(52) U.S. Cl.
CPC . *F16K 15/03* (2013.01); *F16K 1/42* (2013.01); *E21B 34/10* (2013.01); *E21B 2033/005* (2013.01); *E21B 2034/005* (2013.01)

(58) Field of Classification Search
CPC ........... F16K 15/03; F16K 1/42; E21B 34/10; E21B 2033/005; E21B 2034/005
USPC ......... 251/306–307, 298, 333–334, 360, 364; 137/527
See application file for complete search history.

(56) References Cited

U.S. PATENT DOCUMENTS

| | | | | |
|---|---|---|---|---|
| 2,114,789 | A | * | 4/1938 | Urquhart ........................ 251/333 |
| 2,756,017 | A | * | 7/1956 | Silverman ...................... 251/367 |
| 3,744,753 | A | * | 7/1973 | Clow et al. ..................... 251/307 |
| 4,006,883 | A | * | 2/1977 | Hilsheimer .................... 251/307 |
| 4,015,818 | A | * | 4/1977 | Tawakol ........................ 251/307 |
| 4,478,286 | A | | 10/1984 | Fineberg |
| 4,674,575 | A | | 6/1987 | Guess |
| 4,921,258 | A | | 5/1990 | Fournier et al. |
| 5,263,847 | A | | 11/1993 | Akkerman et al. |
| 5,368,060 | A | * | 11/1994 | Worrall et al. ................. 251/334 |
| 5,682,921 | A | | 11/1997 | Rawson et al. |
| 5,984,269 | A | * | 11/1999 | Short et al. .................... 251/305 |
| 6,263,910 | B1 | | 7/2001 | Davis et al. |
| 6,666,271 | B2 | | 12/2003 | Deaton et al. |
| 7,036,204 | B2 | | 5/2006 | Fischer et al. |
| 7,401,763 | B2 | * | 7/2008 | Hartman et al. ............... 251/306 |
| 7,841,416 | B2 | | 11/2010 | Henschel et al. |
| 2008/0047713 | A1 | | 2/2008 | Henschel et al. |
| 2009/0101858 | A1 | * | 4/2009 | Pechtold ........................ 251/333 |
| 2010/0314571 | A1 | | 12/2010 | Roberts et al. |
| 2012/0012202 | A1 | | 1/2012 | Smith et al. |

* cited by examiner

*Primary Examiner* — John Bastianelli
(74) *Attorney, Agent, or Firm* — Steve Rosenblatt

(57) ABSTRACT

A recess is provided at the periphery of the flapper so that a corner that defines this recess engages an o-ring seal in a seat for the flapper. A reduced contact area of the flapper on the o-ring seal results in increased pressure over the actual contact area. The pressure applied over the contact area also forces a distortion in the o-ring that has a part of the o-ring not restrained due to the presence of the recess moving out of the surrounding o-ring groove so that the corner on the flapper pinches the o-ring that now is partly in and partly extending from its surrounding groove. Sealing is obtained at lower differential pressures and the o-ring is better fixated as a result of the pinch effect of the corner on the flapper.

12 Claims, 2 Drawing Sheets

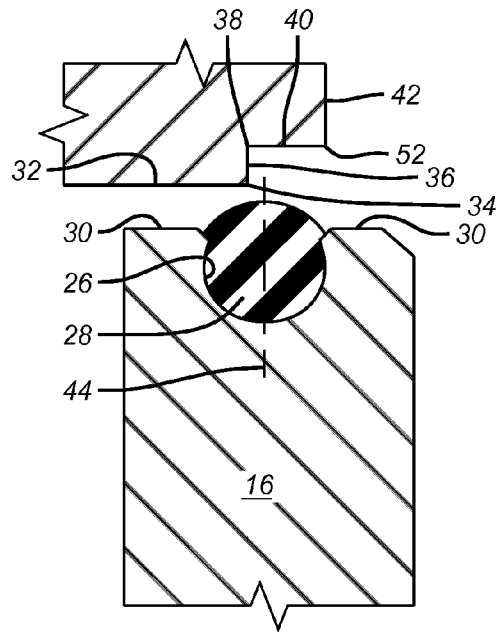
FIG. 3
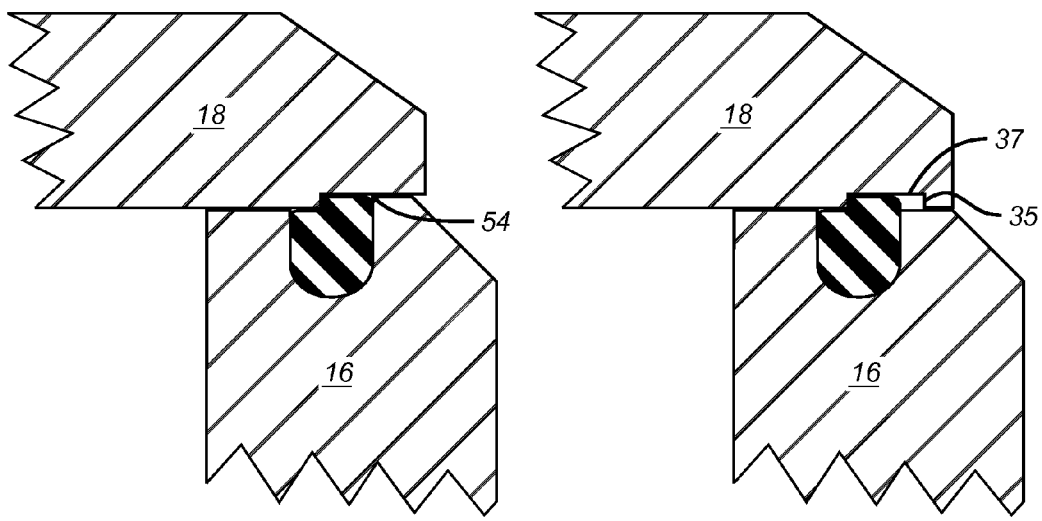
FIG. 4  FIG. 4A

CURVED FLAPPER SEAL WITH STEPPED INTERMEDIATE SURFACE

FIELD OF THE INVENTION

The field of this invention is subsurface safety valves and more specifically those valves with curved flappers that need to seal against large and small pressure differentials using a flapper edge treatment to enhance retention of the seal in the sealing position for those pressure differential conditions.

BACKGROUND OF THE INVENTION

The most common design for a flapper seal places the o-ring seal in a surrounding groove in a seat and allows a flapper having a conforming shape to land squarely on the o-ring seal while using the surrounding groove for seal support. Such a groove is shown in FIG. 9 of US Publication 2010/0314571. A modified form of this basic design is shown in FIG. 2 as item 34 in U.S. Pat. No. 4,478,286. Other designs deploy engaging outcroppings to protect the seal from the moving flow tube and which engage each other when the flapper seats off, as shown in FIGS. 7 and 8 of US Publication 2012/0012202. Other designs such as FIG. 2 of U.S. Pat. No. 7,841,416 use an edge-supported seal 70 that has a tapered shape in section and that has an end that is squarely engaged by the flapper 10. FIG. 11 in U.S. Pat. No. 6,666,271 shows a flapper landing a tapered edge squarely on a soft seat 80 and then if the pressure differential is higher the flapper 18 advances to the hard seat 50. Also of general sealing interest is U.S. Pat. No. 4,921,258 that shows a notch in the sealing element that receives a protruding member 58 to spread out a cantilevered end of the seal into sealing contact with a surrounding member 14. Curved flappers as shown generally in U.S. Pat. No. 5,682,921.

Sealing a flapper becomes more problematic with the designs discussed above at low pressure differentials. The designs that squarely engage the o-ring in low pressure situations do not bear on the o-ring with enough force to ensure proper sealing. In an effort to enhance the seal that is needed at low pressure differentials, the present invention provides a recess in the flapper preferably at its periphery such that only partial contact with the o-ring seal is obtained. This partial contact displaces part of the o-ring out of the groove in the seat such that an edge of the recess digs into the o-ring seal to compress an extending portion of the o-ring against the edge of the groove for fixation and sealing in low differential pressure environments. These and other aspects of the present invention will be more readily apparent to those skilled in the art by a review of the detailed description of the preferred embodiment and the associated drawings while recognizing that the full scope of the invention is to be determined by the appended claims.

SUMMARY OF THE INVENTION

A recess is provided at the periphery of the flapper so that a corner that defines this recess engages an o-ring seal in a seat for the flapper. A reduced contact area of the flapper on the o-ring seal results in increased pressure over the actual contact area. The pressure applied over the contact area also forces a distortion in the o-ring that has a part of the o-ring not restrained due to the presence of the recess moving out of the surrounding o-ring groove so that the corner on the flapper pinches the o-ring that now is partly in and partly extending from its surrounding groove. Sealing is obtained at lower differential pressures and the o-ring is better fixated as a result of the pinch effect of the corner on the flapper.

BRIEF DESCRIPTION OF THE DRAWINGS

FIG. 3 is a closer in view of FIG. 1 with the recess on the flapper positioned close to and not touching the o-ring seal; and FIGS. 4 and 4a are alternative embodiments to FIGS. 1 and 3 showing a closed groove.

DETAILED DESCRIPTION OF THE PREFERRED EMBODIMENT

Figure 1:
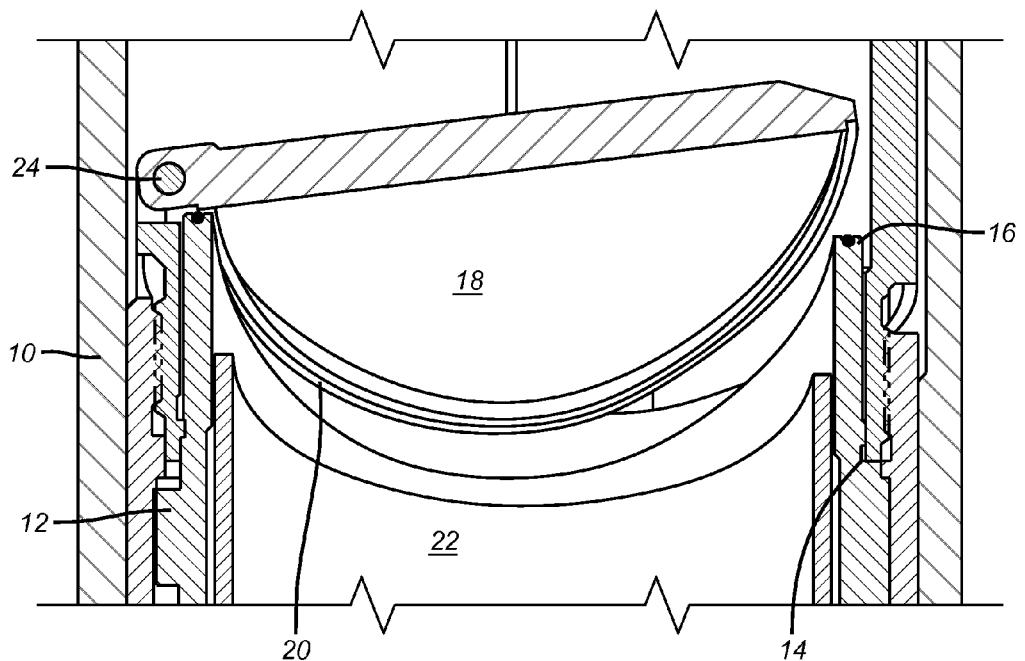
FIG. 1 is a section view of an assembly of the curved flapper and seat showing the recessed edge on the flapper.

FIG. 1 illustrates an outer housing 10 with a flapper seat assembly 12 that has at its lower end a valve body 14 that has a seat 16 at its lower end. The flapper 18 has an undulating edge 20 that conforms to the shape of the seat 16. A flow tube 22 is driven axially in a known manner using a control line or control lines that actuate a piston that is connected to the flow tube 22 for movement in a down direction against the flapper 18. The flow tube 22 is returned with a return spring on loss or removal of pressure for a typical failsafe operation that is well known in the art and suitably described in the references discussed above and is therefore not shown. The flapper 18 is pivotally mounted to shaft 24 for rotation to the open position when the flow tube is pushed toward the flapper 18 as the flow tube continues to advance and places the flapper 18 behind it for the fully open position. Upon loss of control pressure or removal of control pressure the closure spring pushes on the operating piston that moves in tandem with the flow tube 22 to retract the flow tube 22. This allows the flapper 18 to close using potential energy in a coiled spring mounted around shaft 24 that was wound to develop the potential energy as a result of opening of the flapper 18. With the flow tube retracted the spring on shaft 24 urges the flapper 18 against the seat 16.

The seat 16 is shown in more detail in FIG. 3 where a groove 26 holds an o-ring 28 that extends partially beyond the top surface 30. Surface 30 conforms to the preferably undulating or sinusoidal shape of the flapper bearing surface 32. At any section through seat 16 that spans groove 26, such as FIG. 3 the lines defined on opposed ends of groove 26 can be aligned or offset and parallel. Surface 32 ends in a corner 34 that is preferably 90 degrees but can be an acute or an obtuse angle or rounded. Corner 34 is defined between surfaces 32 and 36. A second corner 38 that is preferably 90 degrees but can be obtuse or acute or rounded is disposed between surfaces 36 and 40. Surface 40 extends to the outer periphery 42. Corners 34 and 38 can be rounded rather than coming to a point or a line as measured around the flapper periphery.

Preferably the corner 34 extends radially to approximately the centerline 44 of the o-ring 28 but can also extend short of the centerline 44. The idea is to reduce the contact area of surface 32 against o-ring 28 so that the contact stress will increase when compared to greater contact area by surface 32 on o-ring 28. In low pressure differential situation, there should still be enough force transmitted to the o-ring 28 to compress about half of the portion that extends out of groove 26 and beyond top surface 30.

Figure 2:
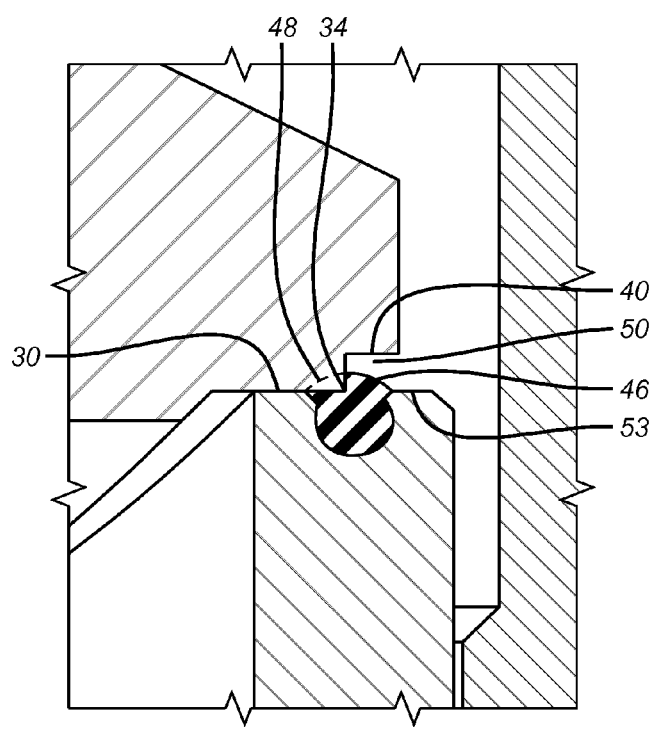
FIG. 2 is a closer in view of FIG. 1 with the flapper in a closed position against the seat.

Another advantage is that the recess defined by surfaces 36 and 40 allows a portion 46 of the o-ring 28 to further protrude past surface 30 as the corner 34 pushes into the o-ring 28 when distorting o-ring 28 by displacing a volume denoted by dashed line 48 that in FIG. 2 is the added volume beyond surface 30 for o-ring 28 as compared to open configuration of FIG. 2.

Those skilled in the art will appreciate that although the o-ring and associated groove are shown in the seat 16 and the edge recess made up of surfaces 36 and 40 are shown in the flapper 18 that those positions can be reversed for the same effect. Surface 40 need not extend to the outer surface 42 but instead can be an interior groove, shown in FIG. 4a, so that it would have a second corner 35 opposite 34 that also makes contact with surface 53 when flapper 18 is in the closed position. In that scenario, the o-ring 28 would be displaced into a closed annular space or recess 37 as opposed to the open annular space 50 shown in FIG. 2. Surfaces 36 and 40 can be planar or arcuate. Outside corner 52 can be a 90 degree angle or acute or obtuse or rounded. The section shape of the o-ring 28 can be circular, elliptical, quadrilateral or some other shape with straight or rounded sides. By pushing on a smaller portion of the o-ring low pressure differentials can still result in a seal. A part of the o-ring is pinched with corner 34 extending into the o-ring 28 to squeeze it into the groove 26 with the portion of the o-ring 28 beyond surface 32 growing outwardly beyond surface 30 to provide two walled contact of the o-ring by surfaces 36 and 40 that straddle corner 34. A single line contact at the corner 34 is preferred.

The above description is illustrative of the preferred embodiment and many modifications may be made by those skilled in the art without departing from the invention whose scope is to be determined from the literal and equivalent scope of the claims below:

We claim:

1. A seal assembly for a flapper type subsurface safety valve, comprising:
    a ring shaped seal mounted in and extending past at least one adjacent end surface to a groove when a flapper is in an open position, said groove disposed in one of a seat or said flapper of the safety valve;
    a bearing surface on the other of said seat and said flapper than said ring shaped seal and configured to contact less than all of said seal that extends beyond said adjacent end surface and further comprising a component that overhangs the remaining entirety of said groove, said bearing surface defining a corner that pushes said ring shaped seal at least in part toward said groove, wherein said corner extends to no more than the centerline of said groove when said flapper is in the closed position.

2. The assembly of claim 1, wherein:
said corner is angled or rounded.

3. The assembly of claim 1, wherein:
said corner distorts the shape of said seal so that adjacent surfaces that define said corner are in contact with said seal.

4. The assembly of claim 1, wherein:
said corner defines an end of a peripheral recess extending past said ring shaped seal.

5. The assembly of claim 4, wherein:
said peripheral recess is open opposite said corner.

6. The assembly of claim 4, wherein:
said recess groove is closed opposite said corner and further comprises a second corner opposite said corner.

7. The assembly of claim 6, wherein:
said second corner clears said seal when said bearing surface on which said second corner is found contacts said adjacent end surface to said groove.

8. The assembly of claim 1, wherein:
said corner pushes a portion of said seal not contacted by said bearing surface out of said groove.

9. The assembly of claim 1, wherein:
said corner pinches said seal to said adjacent end surface.

10. The assembly of claim 1, wherein:
said corner makes a line contact with said seal.

11. The assembly of claim 1, wherein:
said component that overhangs and said at least one adjacent end surface selectively contacting to contain said ring shaped seal when said corner pushes on a portion of said ring shaped seal.

12. The assembly of claim 1, wherein:
said at least one adjacent end surface comprises two ends surfaces on opposed sides of said groove that are disposed in different planes, wherein said end surfaces selectively engage said component for containment of said ring shaped seal when said corner pushes on said ring shaped seal.

* * * * *